Dec. 29, 1936.    R. SIMPSON    2,066,058
BATTERY TESTER
Filed Nov. 23, 1934    2 Sheets-Sheet 2
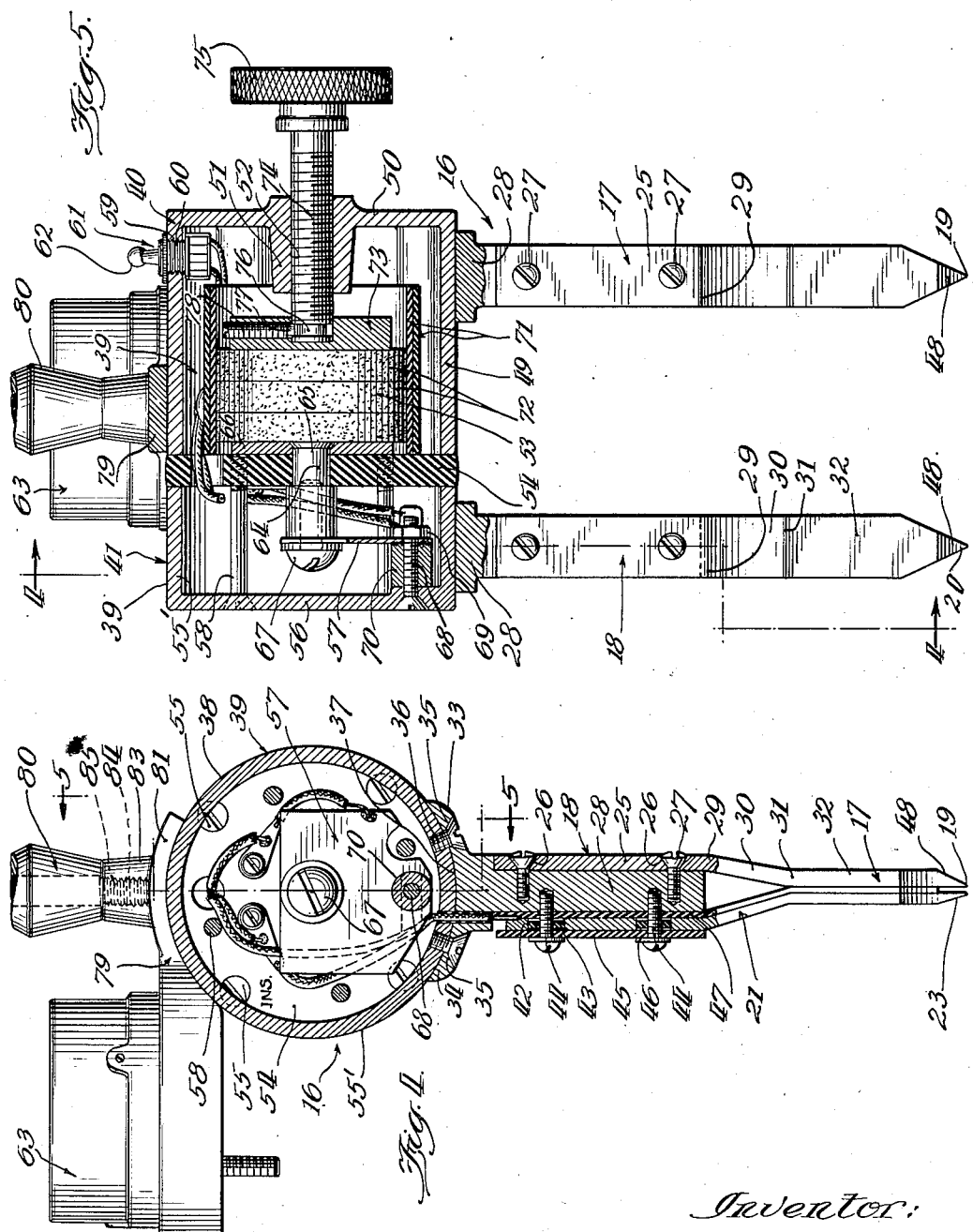
Inventor:
Ray Simpson
By
Williams, Bradbury, McCaleb & Hinkle
Attys.

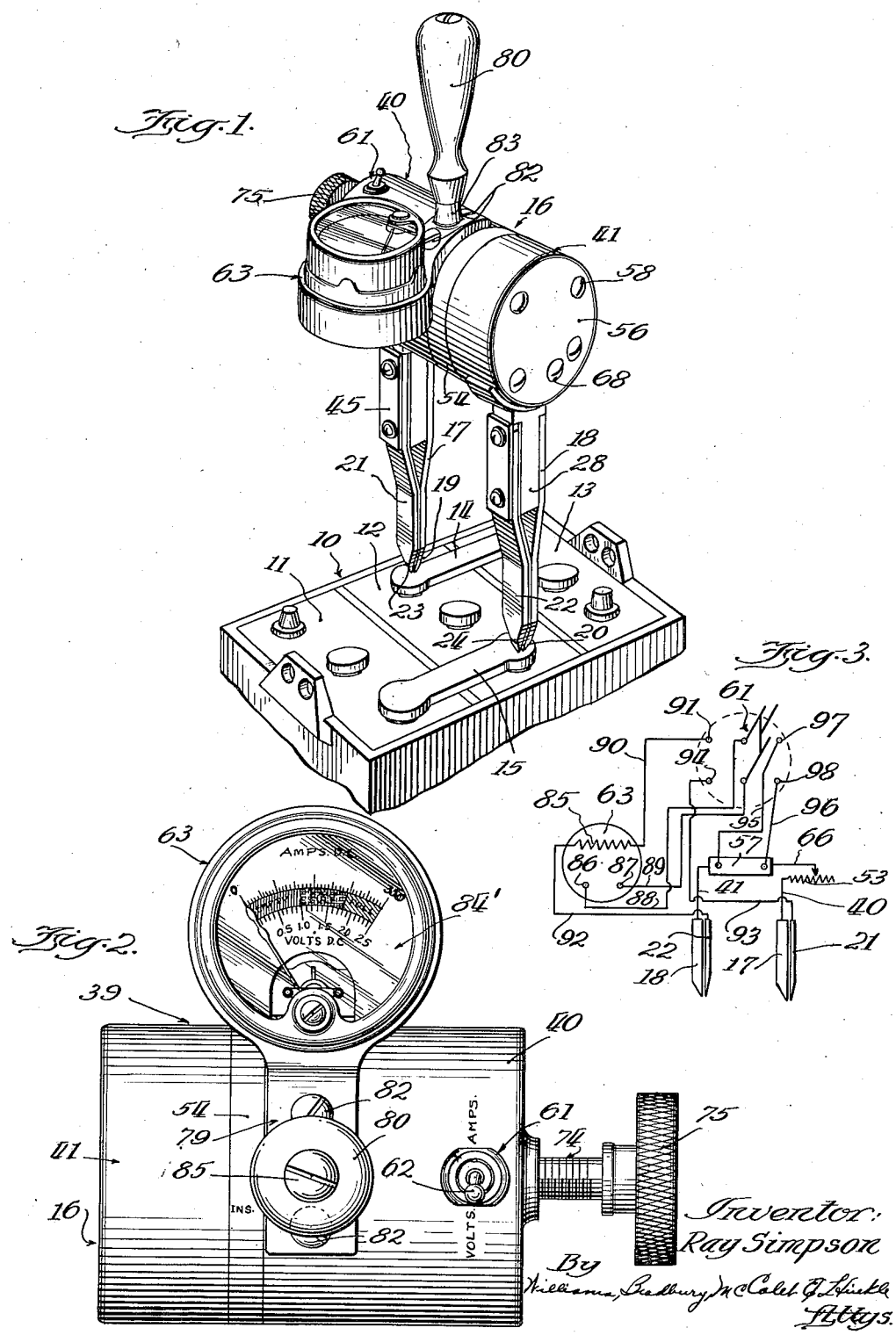

Patented Dec. 29, 1936

2,066,058

UNITED STATES PATENT OFFICE 2,066,058

BATTERY TESTER

Ray Simpson, River Forest, Ill.

Application November 23, 1934, Serial No. 754,413

5 Claims. (Cl. 175—183)

The present invention relates to battery testers, and is particularly concerned with testing devices for determining the true condition of the cells which make up a wet battery.

However, the tester may also be used on other types of batteries, and while it is primarily designed for testing the battery under load, it is also capable of determining the open circuit voltage of the battery.

One of the objects of the invention is the provision of an improved battery testing device which is adaptable to the determination of the condition of battery cells of various sizes or having different numbers of plates.

In the devices of the prior art a tester which is designed for the test of a cell with a small number of plates is not adapted to indicate the true condition of a larger capacity cell having a much larger number of plates. In the testing of such battery cells the tester should draw a current equal to the rated amperage for the battery, and the voltage indication under such a condition is an accurate indication of the condition of the cell.

Another object of the invention is the provision of an improved battery testing device having an adjustable load resistance so that the tester is adapted to be used upon small or large cells, drawing the rated amperage for any type of cell from, for example, a nine plate cell to a twenty-five plate cell or a smaller or larger cell. It should be understood that the number of plates mentioned is merely exemplary of the more commonly used sizes of batteries, and the device may be constructed to indicate accurately the condition of any size of battery cell.

Another object of the invention is the provision of an improved battery tester which may be operated by one not skilled in the use of such electrical devices and on which the indication is given in ordinary words of the English language so that the condition may be understood by any layman.

Another object of the invention is the provision of an improved construction of battery testing device in which the uncertain factor of contact resistance between the current carrying prongs and the battery terminals is eliminated so that a more accurate indication of the true full load voltage is given by the device.

Another object of the invention is the provision of an improved battery tester construction which is sturdy, serviceable, capable of manufacture at a low cost and adapted to be universally used in testing all kinds of batteries.

Other objects and advantages of the invention will be apparent from the following description and the accompanying drawings, in which similar characters of reference indicate similar parts throughout the several views.

Referring to the two sheets of drawings:

Fig. 1 is a view in perspective of the testing device applied to a three cell battery in the test of the middle cell;

Fig. 2 is a top plan view of the testing device;

Fig. 3 is a wiring diagram of the circuits used in the testing device;

Fig. 4 is a sectional view taken on the plane of the line 4—4 of Fig. 5, looking in the direction of the arrows;

Fig. 5 is a sectional view through the testing device taken on the plane of the line 5—5 of Fig. 4, looking in the direction of the arrows.

Referring to Fig. 1, 10 indicates in its entirety an ordinary battery under test, such as that employed in an automotive vehicle and having three cells 11, 12 and 13. The cells are usually connected in series by means of the straps 14 and 15, and in the figure the tester which is indicated in its entirely by the numeral 16 is utilized in testing the middle cell 12.

The tester is preferably provided with a pair of relatively heavy current carrying prongs 17 and 18 which are carried by the body of the tester 16 and spaced sufficiently so that the points 19, 20 of the prongs 17, 18 will engage the opposite terminals of a battery cell simultaneously. In the case of terminals which are spaced closer than the usual spacing the device may still be applied by bringing the points 19 and 20 into contact respectively with a fixed terminal and a strap, the length of the strap permitting simultaneous engagement of the points with the terminals in spite of the difference between the spacing of the terminals and the contact points.

The device is preferably provided with a pair of separate voltage prongs 21, 22, having the points 23, 24 respectively located adjacent the points 19 and 20, and the voltage prongs 21, 22 may be identical in shape and construction to the current prongs 17 and 18 except that the voltage prongs may be relatively lighter in weight and of less thickness because they are not intended to carry much current. All of the prongs 17, 18, 21 and 22 may be constructed of copper or brass or other suitable electrically conductive metal, but it has been found that the least amount of contact burning or other damage is experienced when copper or brass is employed.

Each of the prongs consists of a relatively flat body portion 25 which is provided with countersunk apertures 26 for reception of the securing screws 27 which are threaded into a supporting bracket 28. The body of each of the prongs 18, 19, 21 and 22 is bent inward at 29, extending diagonally at 30, and again bent outward at 31 so that the lower portions 32 extend parallel to each other, but the current prongs are spaced from the voltage prongs respectively.

The brackets 28 consist of metallic members which are rectangular in section and provided with a pair of arcuate attaching flanges 33, 34 at the top, having countersunk apertures 35 for reception of the attaching screws 36.

The inner surface 37 of the bracket 28 and attaching flanges 33, 34 is cylindrical in shape so as to fit the outer cylindrical surface 38 of the parts of the body 39 to which they are secured by the screws 36. The current carrying prong 17 is thus in electrically conductive relation to the right half 40 of the tester body, while the current conducting prong 18 is in electrically conductive relation to the left half 41 of the tester body 39.

The contact resistance caused by the engagement of the points 19 and 20 with the terminals of the battery varies considerably, and since the tester draws a considerable amount of current the voltage drop due to this contact resistance also reaches an appreciable amount. In order to eliminate this uncertain factor in determining the full load voltage, the device is preferably provided with the voltage prongs 21, 22. Each of these members is similar in shape to the current carrying prongs 17, 18, but may be made of relatively thinner stock. The voltage prongs 21, 22 are also provided with enlarged apertures 42 for the reception of the insulating bushings 43 which surround the securing screw bolts 44.

A strip of electrical insulating material 45 is interposed between the washers 46 of bolts 44 and each prong 21, 22, and a second electrical insulating strip 47 is interposed between each of the prongs 21, 22 and the supporting bracket 28 so that the voltage prongs 21, 22 are wholly insulated from the body of the testing device and from the current carrying prongs 17, 18.

The insulating strip 47 may consist of a strip of insulating fiber or a strip of phenolic condensaation compound ordinarily called "bakelite", and it is preferably extended downward between the lower portions of the prongs 17, 21 and 18, 22 so as to insure their being insulated from each other at all times and to prevent the prongs from being bent into contact with each other. The lower points 19, 20, 23, 24 of the prongs are beveled at 48 so as to provide a relatively sharp prong, which may be substantially pyramidal in shape on account of the ease in machining and grinding points of this shape, but any suitably shaped contact point may be used.

The body 39 of the testing device preferably consists of the two portions 40, 41 which may be constructed of aluminum castings or of any suitable electrically conducting material.

The body part 40 consists of a substantially cylindrical cup-shaped member having an outer cylindrical wall 49 and a flat end portion 50 which is provided with an inwardly extending centrally located boss 51 having a threaded bore 52. The body portion 49 provides a housing for a rheostat, indicated in its entirety by the numeral 53. The open end of the body portion 40 is closed by a disc 54 of electrical insulating material such as a phenolic condensation compound which fits over the end of the housing 40 and may be secured thereto by a plurality of screw bolts 55 which are countersunk in the disc 54 and extend into and are threaded in apertures located in the housing 40.

The housing portion 41 also consists of a cylindrical wall 55' similar in size to the cylindrical wall 49, and of a flat end wall 56, and is preferably of a size suitable for housing a shunt plate 57. Housing portion 41 is secured to the remainder of the body 38 by the screw bolts 58 which pass through the end 56 of housing portion 41 and are threaded into the insulating disc 54.

It will thus be observed that the two housing portions 40, 41 are suitably insulated from each other by the disc 54. At one end the housing portion 40 is preferably provided with a bore 59 adapted to receive the threaded supporting body 60 of a double pole, double throw-snap switch, indicated in its entirety by the numeral 61 in the wiring diagram of Fig. 3.

The actuating knob 62 of the snap switch is located adjacent indicia "amps" and "volts" on opposite sides of the switch and placed on the housing portion 40 (Fig. 2) so as to indicate whether the meter 63 is connected for measurement of volts or amperes.

The insulating disc 54 is provided with an electrical conducting stud 64, the inner end of which is reduced in size and riveted at 65 to a metal contact plate 66. The opposite end of the stud 64 carries the shunt plate 57 which is secured to the stud by means of the screw bolt 67. The shunt plate 57 is also connected by means of bolt 68 to the end 56 of housing 41 and is suitably secured in place by means of the nut 69, which clamps the shunt plate 57 against the spacer sleeve 70. The housing portion 40 is also provided with one or more insulating tubes 71 for lining the housing with insulating material and suitably insulating the carbon rheostat discs 72 from the parts of the housing 40.

A suitable number of carbon rheostat discs 72 are slidably mounted in the insulating tubes 71 in contacting engagement with each other and with the contact plate 66 to form a carbon pile, the resistance of which may be varied by varying the pressure on the pile. In order to vary this pressure and to complete the circuit, a second metallic contact plate 73 is provided, the latter being rotatably mounted upon the end of the adjustment screw 74, which has a relatively large knurled knob 75 exterior to the housing 40. The pressure adjustment screw 74 is provided with threads complementary to those of the bore 52, and its opposite end is provided with an annular groove 76 for receiving the reduced end 77 of a set screw 78 which is threaded radially into the contact plate 73.

The contact plate 73 is thus roatably mounted on the screw 74, and when frictionally engaged by the carbon pile 53 it remains fixed with respect to rotation of the screw 74. The boss 51 preferably extends into the housing 40 sufficiently to prevent the plate 73 from being withdrawn far enough to interfere with the snap switch 61.

The testing device is preferably provided with a common supporting bracket 79 for the meter 63 and handle 80. The bracket 79 is provided with an arcuate attaching flange 81 which has a cylindrical surface conforming to the outer surface of the housing portion 40 to which it is attached by the screw bolts 82. The bracket also has an upwardly extending boss 83 which has a threaded bore 84 for receiving the screw bolt 85 which passes through the handle 80 and secures it to the bracket 79.

Any suitable type of electric meter 63 may be employed, provided it is suitable in range, but it is preferably adapted to be used for measuring both the current and the voltage. For this purpose it is provided with a dial 84' having the scale indicia which may, for example, be provided with numerals 0 to 350 indicating the amperage, and another arc of scale indicia provided with markings from zero to 2.5 for indicating the direct current voltage. Between the two scales there may be a plurality of colored arcuate areas bearing the indicia "Empty", "Half full" and "Full". The boundaries of these areas may be varied according to the judgment of the manufacturer, but ordinarily the battery cell may be considered as practically empty when the full load voltage is below one volt, and it may be considered as fully charged or full when the full load voltage is about 1.8 or more. The empty area of the dial may be colored red to indicate danger, the half full area yellow to indicate caution or desirability of charge, and the full area may be colored green to indicate that the battery is in condition for operation.

The wiring diagram is shown in Fig. 3 and it will be observed that the meter 63 is shown with a resistance 85. The resistance 85 is so connected that it may be placed in series by the switch 61 when the meter is used as a volt meter.

In order to accomplish these results, the terminals 86 and 87 of the meter may be connected by conductors 88, 89 to the moving contact arms of the switch 61. One end of the resistance 85 may be connected by conductor 90 to one fixed contact 91. The other end of resistance 85 may be connected by conductor 92 to the voltage prong 22. The other voltage prong 21 may be connected by conductor 93 to fixed contact 94. It will thus be observed that when the switch 61 is thrown into engagement with contacts 91, 94 the meter 63 is connected through resistance 85 in series with the voltage prongs 21 and 22.

The current-carrying prong 18 may be connected by means of the body 41 which is also indicated as a conductor 41 to the shunt plate 57. The other current-carrying prong 19 may be connected by a conductor 40, which is also the body portion 40, to the variable resistance or carbon pile 53, which in turn is connected by the contact plate 66 and stud 64, which are indicated as 66 on the wiring diagram to the shunt 57.

Conductors 95, 96 also lead from each of the terminals of the shunt plates 57 to the fixed contacts 97, 98. It will thus be observed that current is conducted through the prongs 18 and 19 to the shunt 57 and carbon pile 53 in series, and a portion of that current is carried through conductors 95, 96, fixed contacts 97, 98 and switch 61 to the terminals of the ammeter 63.

The method of use of this device is as follows: The prong points 19, 20, 23 and 24 are brought into firm engagement with the terminals and of the battery cell, after which the device should be held in the same position so as to maintain contact, the switch being in position to indicate the load current in amperes.

The rheostat adjustment screw 74 is then adjusted so that the full rated load in amperes appears on the scale, and a chart is provided with the device to inform the operator of the full load current for batteries of certain numbers of plates. For example, a nine plate battery of a certain type may have full load rating of 105 amperes, and the load rheostat should be so adjusted that such is the load on that battery.

When the device indicates full load current, the switch 61 may be thrown over to the voltage position, and the same meter will immediately indicate the voltage at that time. If the battery shows a satisfactory voltage at full load, it is in good condition, as indicated by the dial 84'.

It will thus be observed that I have invented an improved battery testing device which may be used upon batteries of various capacities for indicating the full load voltage, and every battery may be tested at its full rated amperage. The results indicated are not affected by the heavy contact resistance at the points of the current-carrying prongs, since separate contacts are provided for connecting the volt meter to the cell.

The present device is also capable of being operated by any one unskilled in the art, since the dial itself indicates the condition of the battery, which may be read in ordinary words of the English language.

The present construction is very sturdy and serviceable, and the device may be so operated that it is impossible to damage the meter, since the resistance at the rheostat may be made so large that the initial current in the meter is very low and there is no possibility of the meter being over-loaded, if the meter is watched while the pressure is applied to the carbon pile.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a battery tester, the combination of a supporting body adapted to house a plurality of carbon discs with a pressure plate and a screw for actuating said pressure plate, said plate engaging said discs, a pair of current-carrying prongs in connection with said discs for conducting current to said discs, current-measuring means for indicating the current carried by said prongs, an electrical multiplying resistance, switching means for controlling the connection of said resistance in the circuit, said current-measuring means also having a voltage dial for indicating the full load voltage, said body comprising a pair of metallic housing parts separated by an insulating partition, and said current-carrying prongs being in conducting relation with said housing parts.

2. In a battery tester, the combination of a metallic housing comprising a pair of substantially similar cylindrical members, an insulating partition interposed between said cylindrical members and secured thereto to insulate the parts of the housing from each other, a pair of current-carrying conductors, one carried by each part of the housing, and projecting laterally from said housing, an electrically conducting pressure plate carried by said insulating partition and connected to one conductor, a plurality of resistance members mounted to engage said pressure plate and to engage each other in series in one part of said housing, threaded means extending axially of said housing and having threaded engagement with said latter part of said housing, a second pressure plate carried by said threaded means for engaging said pile to transmit pressure from said threaded means to said resistance means, and electrical measuring means adapted to be connected to said pile to indicate the voltage or current resulting from the connection of said conductors to a battery.

3. In a battery tester, the combination of a metallic housing comprising a pair of substantially similar cylindrical members, an insulating partition interposed between said cylindrical members and secured thereto to insulate the parts of the housing from each other, a pair of current-carrying conductors, one carried by each part of the housing and projecting laterally from said housing, an electrically conducting pressure plate carried by said insulating partition and connected to one conductor, a plurality of resistance members mounted to engage said pressure plate and to engage each other in series in one part of said housing, threaded means extending axially of said housing and having threaded engagement with said latter part of said housing, a second pressure plate carried by said threaded means for engaging said pile to transmit pressure from said threaded means to said resistance means, electrical measuring means adapted to be connected to said pile to indicate the voltage or current resulting from the connection of said conductors to a battery, and switching means for controlling the connection of said electrical measuring means.

4. In a battery tester, the combination of a metallic housing comprising a pair of substantially similar cylindrical members, an insulating partition interposed between said cylindrical members and secured thereto to insulate the parts of the housing from each other, a pair of current-carrying conductors, one carried by each part of the housing, and projecting laterally from said housing, an electrically conducting pressure plate carried by said insulating partition and connected to one conductor, and a plurality of resistance members mounted to engage said pressure plate and to engage each other in series in one part of said housing, threaded means extending axially of said housing and having threaded engagement with said latter part of said housing, a second pressure plate carried by said threaded means for engaging said pile to transmit pressure from said threaded means to said resistance means, electrical measuring means adapted to be connected to said pile to indicate the voltage or current resulting from the connection of said conductors to a battery, said resistance members comprising discs of carbon, and an insulating sleeve mounted in said housing surrounding said resistance members and slidably supporting said resistance members.

5. In a battery tester, the combination of a metallic housing comprising a pair of substantially similar cylindrical members, an insulating partition interposed between said cylindrical members and secured thereto to insulate the parts of the housing from each other, a pair of current-carrying conductors, one carried by each part of the housing, and projecting laterally from said housing, an electrically conducting pressure plate carried by said insulating partition and connected to one conductor, a plurality of resistance members mounted to engage said pressure plate and to engage each other in series in one part of said housing, threaded means extending axially of said housing and having threaded engagement with said latter part of said housing, a second pressure plate carried by said threaded means for engaging said pile to transmit pressure from said threaded means to said resistance means, electrical measuring means adapted to be connected to said pile to indicate the voltage or current resulting from the connection of said conductors to a battery, and auxiliary electrical conducting members carried by said first conductors, but insulated therefrom, and adapted to engage a battery terminal at the same time, for connection to said measuring means when used as a voltmeter.

RAY SIMPSON.